United States Patent [19]

Frost

[11] 4,127,691
[45] Nov. 28, 1978

[54] THERMAL SHOCK RESISTANT HONEYCOMB STRUCTURES

[75] Inventor: Rodney I. Frost, Corning, N.Y.

[73] Assignee: Corning Glass Works, Corning, N.Y.

[21] Appl. No.: 807,889

[22] Filed: Jun. 20, 1977

[51] Int. Cl.$^2$ .............................................. B32B 3/12
[52] U.S. Cl. ................................... 428/116; 422/179; 252/477 R
[58] Field of Search .......................... 428/116–120; 23/288 R, 288 FC; 252/477 R

[56] References Cited

U.S. PATENT DOCUMENTS

| | | | |
|---|---|---|---|
| 3,112,184 | 11/1963 | Hollenbach | 428/116 X |
| 3,444,925 | 5/1969 | Johnson | 428/116 X |
| 3,790,654 | 2/1974 | Bagley | 428/116 X |
| 3,887,741 | 6/1975 | Dwyer | 428/116 X |
| 3,899,326 | 8/1975 | Frost et al. | 428/116 X |
| 3,903,341 | 9/1975 | Gerhold | 428/116 |
| 3,919,384 | 11/1975 | Cantaloupe et al. | 428/116 X |
| 3,983,283 | 9/1976 | Bagley | 428/116 |
| 4,042,738 | 8/1977 | Gulati | 428/116 |

*Primary Examiner*—Henry F. Epstein
*Attorney, Agent, or Firm*—Richard N. Wardell; Clarence R. Patty, Jr.

[57] ABSTRACT

Honeycomb structures of brittle material having a plurality of cells extending longitudinally therethrough. When viewed in a plane perpendicular to a longitudinal axis through the structure, the plurality of cells extend thereacross and, with the exception of peripheral cells, are all of uniform size and shape. The shape is a rectangle whose length is twice its width. The cells are contiguously arranged in a repeating pattern that provides a "flexible" rectangle cellular structure wherein wall portions and joints formed by intersecting wall portions are movable to compensate for expansion/contraction stresses or forces thermally induced within the cellular structure, thereby tolerating significant strains without breaking the structure.

3 Claims, 3 Drawing Figures

THERMAL SHOCK RESISTANT HONEYCOMB STRUCTURES

CROSS-REFERENCE TO RELATED APPLICATION

Copending United States patent application Ser. No. 711,987, filed Aug. 5, 1976 by G. E. Bonin, S. M. Dockerty, W. P. Lentz and R. V. VanDewoestine, and commonly assigned herewith, discloses and claims a generic invention, of which the invention disclosed and claimed in this application is a new and improved species not disclosed in the noted earlier application.

BACKGROUND OF INVENTION

Thin-walled cellular or honeycomb structures of brittle materials are desirable for many uses and in particular for uses involving flow of hot fluids through such structures. Currently prominent among such uses are those wherein these structures serve as catalyst supports and heat exchange media mounted in casings or housings. Commonly these structures are fabricated of ceramic or glass-ceramic materials, although any of a great variety of other brittle materials (e.g. glass, cermet or brittle metal materials) could be employed as desired if they provided compatible properties (e.g. refractoriness, strength, chemical resistance, abrasion resistance, etc.) for the particular service conditions involved. Fabrication has been particularly convenient by firing the particulate form of such materials into their sintered materials form. The thin walls can usually vary in thickness from about 0.002 inch to about 0.050 inch and in porosity volume up to 50% or so. Cell densities can vary between about 20–900 cells/square inch of transverse cross-sectional area. It has been especially desirable for obtainng low back pressure effect to select wall thicknesses and cell densities to provide open frontal area of about 75% or greater.

One of the serious problems encountered with the varying flow of hot fluids through these thin-walled honeycomb structures in their breakage resulting from the thermal shock of extreme temperature variations over relatively short distances within these structures. In fact, such thermal shock breakage may result from nonuniform heating and/or cooling of the structures by any means. Often, this problem is minimized or avoided by fabricating the structures of a material having a very low coefficient of thermal expansion and/or with porosity and/or microcracks in the crystal structure thereof. However, it is not always possible to employ a material with an adequate degree of these thermal-shock-resistant features because of the service requirements for other properties (such as refractoriness) and/or because of the severity of thermal shock to be withstood.

Alternative or supplementary techniques previously proposed for enhancing thermal shock resistance of the thin-walled honeycomb structures have involved various structural modifications or cell configurations. U.S. Pat. No. 3,887,741 discloses employment of grooves in the periphery of the structures. U.S. Pat. No. 3,983,283 proposed making the structures with some discontinuities in the cell walls. Commonly assigned copending application Ser. No. 672,155, filed Mar. 31, 1976 by S. T. Gulati, shows structures with convexly and concavely curved (or "wiggly") walls. The above-noted application Ser. No. 711,987 teaches forming the structures with cross-sectional cell configurations that are T-shape, L-shape, cruciform, Z-shape and bow tie shape.

SUMMARY OF INVENTION

I have discovered, and it is an object of my invention to provide, a novel "flexible" rectangle cell geometry or configuration for thin-walled honeycomb structures of brittle material that contributes improved thermal shock resistance to such structures.

The honeycomb structure of my invention comprises a unitary or monolithic body of cellular structure having a plurality of cells extending longitudinally therethrough. These cells are defined by a matrix of interconnected web portions forming partitions between and wall portions of the cells. When viewed in a plane perpendicular to a longitudinal axis through the body, the cells extend across the body and, with the exception of peripheral cells, are of uniform rectangular size and shape. In particular, the cell shape is a rectangle whose length is twice its width and which is defined by a pair of opposed long wall portions and a pair of opposed short wall portions. In the "flexible" rectangle cell geometry, each cell (with the exception of peripheral cells) is contiguously surrounded by: (a) another one cell sharing each short wall portion of said each cell with the rectangle length of said one cell being perpendicular to the rectangle length of said each cell, and (b) another two cells each sharing one-half of each long wall portion of said each cell, one of said two cells having its rectangle length parallel to the rectangle length of said each cell and the other of said two cells having its rectangle length perpendicular to the rectangle length of said each cell. Analogous to the cell geometries shown in the application Ser. No. 711,987, my unique cell geometry provides joint means formed by the intersection of adjacent wall portions which is movable to compensate for expansion/contraction stresses or forces thermally induced within the cellular structure.

DESCRIPTION OF PREFERRED EMBODIMENTS

Figure 1:
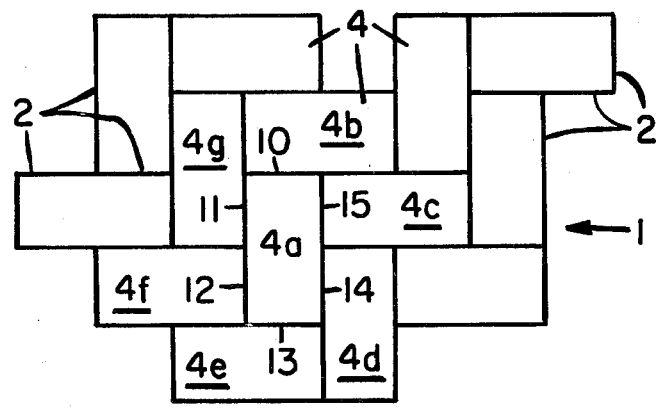
FIG. 1 is an enlarged schematic view of a fragment of the face of a honeycomb structure according to my invention, which face is in a plane perpendicular to the longitudinal axis of the structure.

As illustrated in FIG. 1, the honeycomb or cellular structure 1 is comprised of a matrix of interconnected web portions 2 which form a plurality of rectangular cells 4 that extend longitudinally through the structure 1. Thus, web portions 2 define or constitute partitions between or wall portions of adjoining cells 4. All of the cells 4 (except peripheral cells of the structure 1 which are not shown) are of an identical or uniform size and shape such that a fluid flow front presented to the matrix of such cells will experience a substantially uniform impedence to flow through all of the cells across the face of such matrix.

The cross-sectional shape of each cell 4 is a rectangle whose length is twice its width. By way of an exemplary illustration, a cell 4a is defined by interconnected wall portions 10, 11, 12, 13, 14 and 15, each of which are of equal length. Wall portions 10 and 13 constitute a pair of opposed short wall portions of cell 4a that normally intersect at right angles with a pair of opposed long wall portions of cell 4a, which are respectively composed of normally straight continuous wall portions 11, 12 and 14, 15. Accordingly, the length of the rectangle shape of cell 4a is defined by the length of each long wall portion 11, 12 and 14, 15, while the width of such shape is defined by the length of each short wall portion 10 and 13.

The "flexible" rectangle cell geometry or configuration according to my invention is especially further characterized by the particular arrangement of each cell with the cells contiguously surrounding it. For example, cell 4a is contiguously surrounded by six cells 4b-g. Each short wall portion 10 and 13 is shared respectively with a cell 4b and 4e, each latter cell having the length of its rectangle shape perpendicular to the rectangle shape length of cell 4a. Each of cells 4c, 4d, 4f and 4g share one-half of a long wall portion of cell 4a, viz. respectively portions 15, 14, 12 and 11. Cells 4c and 4f have their rectangle shape lengths perpendicular to such length of cell 4a, whereas the rectangle lengths of cells 4d and 4g are parallel to that of cell 4a.

Despite the brittle nature of the material of which the structures of my invention are made, the walls and wall joints of such structures can undergo a limited amount of flexure and movement under applied stress without breakage of the structure. In fact, it is precisely because of such flexure and movement capability that these structures do not break when subjected to structural distortion stresses therein, as occurs under imposed thermal shock conditions that produce severe temperature gradients (and corresponding expansion/contraction gradients) within the structures. Such stress compensation, accomodation or relief that avoids breakage is not possible in more rigid structures, such as those with uniformly aligned rectangular or square cell shape or geometry (as shown in FIGS. 3-6 of U.S. Pat. No. 3,790,654).

Figure 2:
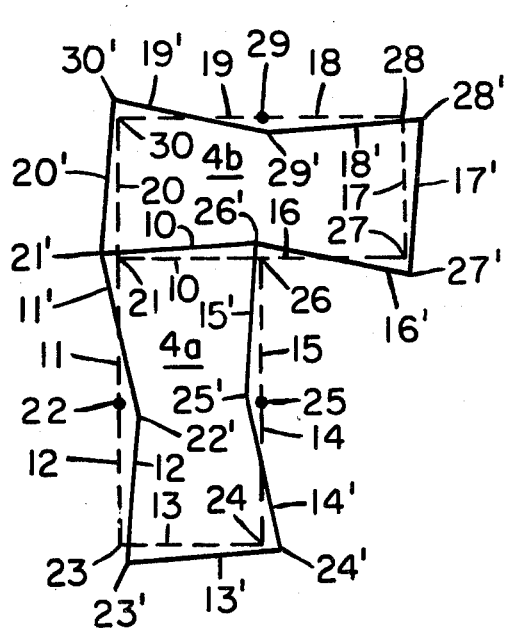
FIG. 2 is an enlarged idealized representation of selected cells of FIG. 1 whose walls are hotter and expanded about 10% relative to walls of cell structure (not shown) in the area surrounding the selected cells.
Figure 3:
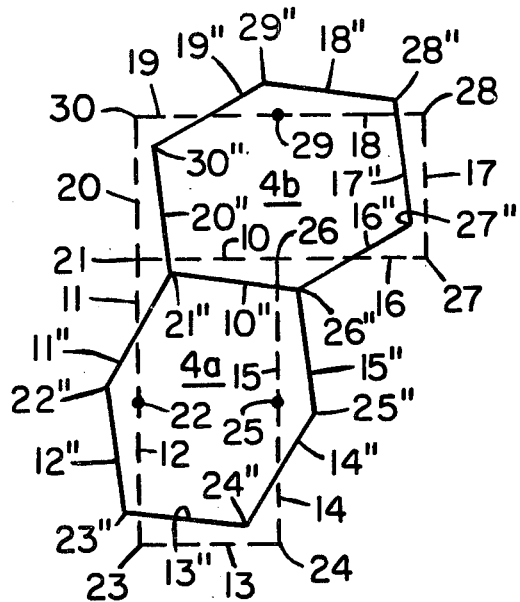
FIG. 3 is an enlarged idealized representation of selected cells of FIG. 1 whose walls are colder and contracted about 10% relative to walls of cell structure (not shown) in the area surrounding the selected cells.

To provide a better understanding of the stress-compensating "flexible" nature of structures in accordance with my invention, reference is made to FIGS. 2 and 3. Cells 4a and 4b are shown in their normal configuration by the dotted lines. Comparable to cell 4a, cell 4b is defined by interconnected wall portions 10, 16, 17, 18, 19 and 20.

In FIG. 2, the solid lines show idealized stress-induced distortion of cells 4a and 4b when the walls of those cells are hotter than the walls of cells (not shown) in the area surrounding them, such that the hotter wall portions are about 10% longer than the colder wall portions of cell structure in the surrounding area. Thus, wall portions 10-20 are moved and flexed from their normal positions to positions 10'-20', respectively, while wall joints 21-30 are simultaneously moved from their normal positions to positions 21'-30', respectively. It will be recognized that the cell structure immediately surrounding distorted cells 4a and 4b will be a short transition zone relative to temperature and distortion between hotter cells 4a-b and the colder cells in the surrounding area.

The solid lines in FIG. 3 show idealized stress-induced cell distortion from a condition opposite to that of FIG. 2, viz. cells 4a and 4b are colder than the surrounding cell structure whereby their colder wall portions are about 10% shorter than the hotter wall portions of cell structure (not shown) in the area surrounding them. In this case, wall portions 10-20 and wall joints 21-30 are shifted from their normal positions to positions 10"-20" and 21"-30", respectively, again with a short transition zone immediately surrounding the distorted cells 4a and 4b.

The preceding illustrations show that the cell structure of this invention has movable or expansion joints which permit movement of the cell walls in response to and to compensate for stresses and strains generated by nonuniform thermal expansion and contraction of the cellular matrix. Moreover, such structure is able to compensate for radial temperature and expansion/contraction gradients induced by substantial heating/cooling of either the periphery or the central portion of the honeycomb structure. Such compensation or accomodation of gradients occurs with some "squeezing" and/or "stretching" of cells in various transverse directions without causing any large discernible displacement of cell walls, thereby indicating that such structures do possess considerable strain tolerance.

Several comparative tests of conventional square cell honeycomb structures and "flexible" rectangle honeycomb structures have shown the superior thermal shock resistance of the latter. In all samples, wall thicknesses were about 10-12 mils. They were made by the extrusion method disclosed in U.S. Pat. No. 3,790,654. To produce the "flexible" rectangle structures, a die for producing a structure with 200 square cells/inch$^2$ was modified by blocking off appropriate portions of the discharge slots therein so that the remaining unblocked discharge slots defined the "flexible" rectangle pattern or configuration yielding 100 cells/inch$^2$.

One thermal shock test involved heating samples, with a diameter of 3.71 inches and a length of 3 inches, in a furnace to a predetermined temperature and then quickly withdrawing them from the furnace to cool in air at room temperature. If no crack developed in a given sample as a result of that heating and cooling sequence, that sequence was repeated with the predetermined temperature being 100° C. higher on each repetition until the sample exhibited a crack resulting from such testing. One set of tested samples was made of 60 wt.% zirconia/40 wt.% magnesium aluminate spinel ceramic with wall porosity of about 13-16 vol.%. Two such samples with cell density of 200 square cells/inch$^2$ survived (did not crack) at 700° C., but failed (cracked) at 800° C. in this test. In contrast, two samples with 100 "flexible" rectangle cells/inch$^2$ survived 1000° C. In a second set of tested samples of composition the same as the previous set, but with about 26-31 vol.% wall porosity, a pair with 200 square cells/inch$^2$ survived 600° C. and failed at 700° C., whereas a pair with 100 "flexible" rectangle cells/inch$^2$ survived 1000° C. A third set of tested samples was made of 50 wt.% zirconia/50 wt.% magnesium aluminate spinel ceramic with wall porosity of about 15 vol.%. One of these samples with 200 square cells/inch$^2$ survived 700° C. and failed 800° C. while another with the same square cell density survived 500° C. and failed 600° C. Two others of this third set with 100 "flexible" rectangle cells/inch$^2$ survived 1000° C.

Another thermal shock test involved alternately passing hot combustion gases (at a predetermined entry temperature) and warm air (at about 200° C.) through the cells of four identical honeycomb structure samples with a diameter of 4.66 inches and a length of 3 inches. One cycle of the test was hot gases for four minutes and then warm air for 8 minutes. After 150 repeated cycles, a determination was made of how many samples had developed cracks during the test. The test was repeated with the hot gases at different predetermined temperatures until there was found a temperature (designated threshold temperature) at which half of the samples had cracked as a result of testing. A tested set of samples was made of 45 wt.% cordierite/55 wt.% mullite ceramic with about 42 vol.% wall porosity. Samples having 300 square cells/inch$^2$ were found to have a threshold temperature of 650° C., whereas samples having 100 "flexible" rectangle cells/inch$^2$ were found to have a threshold temperature between 850°–900° C. From previous experience with testing samples of both 200 and 300 square cells/inch$^2$, those with 200 square cells/inch$^2$ would be expected to have a threshold temperature slightly higher, but not more than about 50° C. higher, than such temperature for those with 300 square cells/inch$^2$.

It will be appreciated that my invention is not limited to the particular preferred embodiments set forth above. Wall thickness, wall porosity and cell density can be varied within and beyond the limits mentioned in the Background section above. For example, I contemplate my invention embracing a honeycomb structure with walls 0.050 inch thick, cell density of 10 cells/inch$^2$ and about 70% open frontal area. The geometric form of the outside perimeters of structures with my "flexible" rectangle cell geometry can be of any desired shape, e.g. circular, oval, polygonal, etc. Any brittle material deemed appropriate for any particular service use of the honeycomb structure of my invention can be used to form such structure. A wide variety of such brittle materials of glass, ceramic, glass-ceramic, cermet and brittle metals are well known, among which many exemplary ones are mentioned for thin-walled honeycomb structures in U.S. Pat. Nos. 3,112,184 and 3,444,925. Moreover, my structures could be made of brittle carbon (graphite) or organic resin (polymer) materials that may need the benefit of the improved thermal shock resistance of the "flexible" rectangle cell geometry.

I claim:

1. A honeycomb structure of brittle material having improved thermal shock resistance and comprising a unitary body of cellular structure having a matrix of interconnected web portions which form a plurality of cells extending longitudinally through said body; said web portions defining partitions between, and wall portions of, the cells; said plurality of cells, when viewed in a plane perpendicular to a longitudinal axis through said body, extending across said body and, with the exception of peripheral cells, all being of uniform size and shape; and each of said cells having joint means formed by the intersection of adjacent wall portions which is movable to compensate for expansion/contraction stresses thermally induced within the cellular structure.

wherein the improvement comprises said shape of the cells being a rectangle whose length is twice its width and being defined by a pair of opposed long wall portions and a pair of opposed short wall portions; each cell, with the exception of peripheral cells, being contiguously surrounded by: (a) another one cell sharing each short wall portion of said each cell and having its rectangle shape length perpendicular to the rectangle shape length of said each cell, and (b) another two cells each sharing one-half of each long wall portion of said each cell, one of said two cells having its rectangle shape length parallel to the rectangle shape length of said each cell and the other of said two cells having its rectangle shape length perpendicular to the rectangle shape length of said each cell.

2. The structure of claim 1 wherein the brittle material is selected from the group consisting of ceramic material, cermet material and metal material.

3. The structure of claim 2 wherein the brittle material is ceramic material.

* * * * *

UNITED STATES PATENT OFFICE
CERTIFICATE OF CORRECTION

Patent No. 4,127,691      Dated November 28, 1978

Inventor(s) Rodney I. Frost

It is certified that error appears in the above-identified patent and that said Letters Patent are hereby corrected as shown below:

Column 1, line 42, change the word "in" to -- is -- .

Signed and Sealed this

Twentieth Day of March 1979

[SEAL]

Attest:

RUTH C. MASON
*Attesting Officer*

DONALD W. BANNER
*Commissioner of Patents and Trademarks*